No. 845,272. PATENTED FEB. 26, 1907.
C. A. SHALER.
VULCANIZER.
APPLICATION FILED JULY 19, 1906.
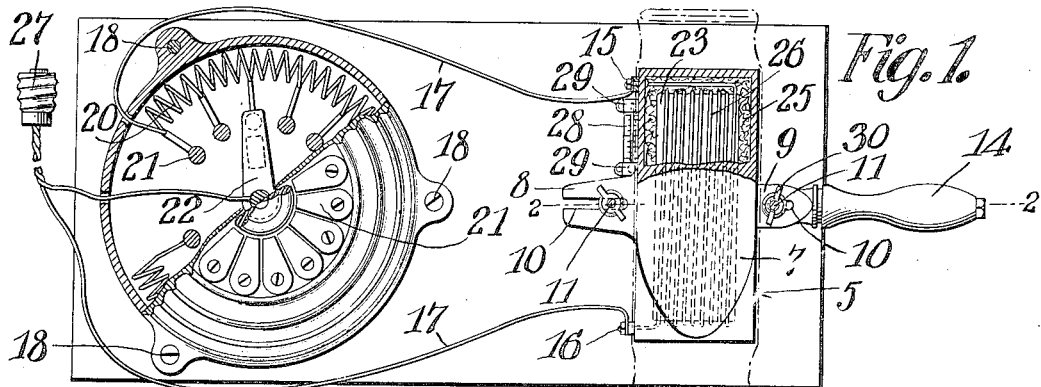
Fig. 1.
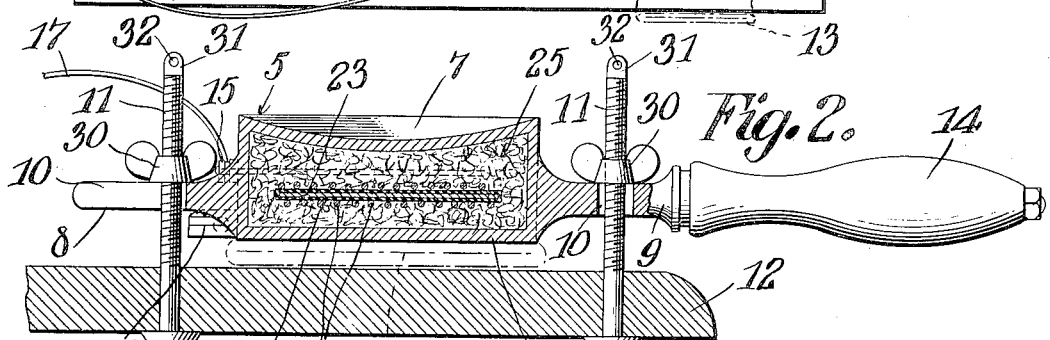
Fig. 2.
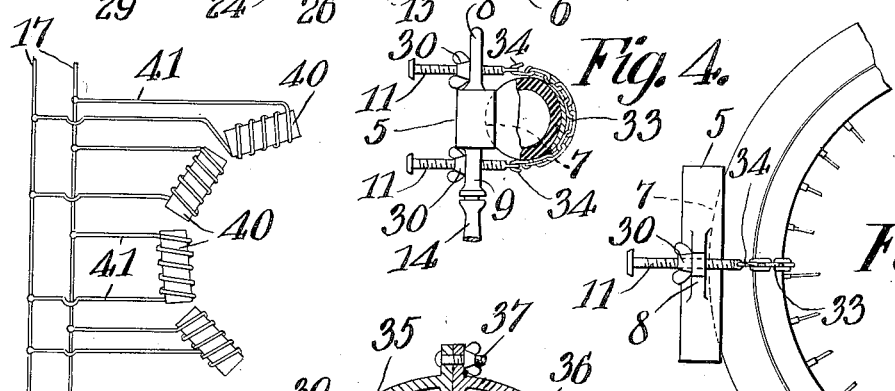
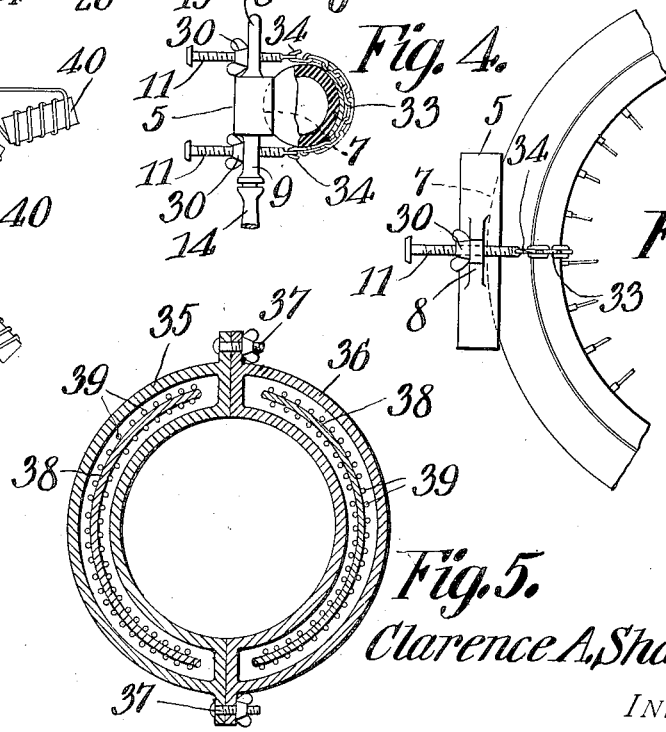
WITNESSES:
Clarence A. Shaler,
INVENTOR
By C. A. Snow & Co.
ATTORNEYS

UNITED STATES PATENT OFFICE.

CLARENCE A. SHALER, OF WAUPUN, WISCONSIN.

VULCANIZER.

No. 845,272.　　　　Specification of Letters Patent.　　　Patented Feb. 26, 1907.

Application filed July 19, 1906. Serial No. 326,886.

*To all whom it may concern:*

Be it known that I, CLARENCE A. SHALER, a citizen of the United States, residing at Waupun, in the county of Fond du Lac and State of Wisconsin, have invented a new and useful Vulcanizer, of which the following is a specification.

This invention relates to vulcanizers of that general class employed for repairing the tires of bicycle, automobile, and similar vehicle wheels.

The object of the invention is to provide a comparatively simple and inexpensive device of the character described by means of which cuts or punctures in the outer tube or blow-outs to the inner tube of the tire may be quickly and expeditiously repaired.

A further object is to provide a portable vulcanizer capable of being quickly placed in position on the tire without the necessity of removing the latter from the wheel-rim and which may also be used for repairing the inner tube when the latter is removed from the tire.

A further object is to provide a heater including a casing having a flat base and a concaved upper face to conform to the shape of the tire, said heater being operatively connected with a suitable source of electrical energy and having a rheostat associated therewith, whereby the heater may be maintained at a uniform temperature during the vulcanizing operation.

A still further object of the invention is to generally improve this class of devices so as to increase their utility, durability, and efficiency.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a top plan view, partly in section, of vulcanizing apparatus constructed in accordance with my invention. Fig. 2 is an enlarged transverse sectional view taken on the line 2 2 of Fig. 1. Fig. 3 is a side elevation showing the device in position on the outer tube of the tire. Fig. 4 is a transverse sectional view of Fig. 3. Fig. 5 is a transverse sectional view illustrating a modified form of the invention. Fig. 6 is a diagrammatical view showing the heating-coils connected in multiple.

Similar numerals of reference indicate corresponding parts in all of the figures of the drawings.

The device comprises a casing or heater 5, preferably cast or otherwise formed of metal and substantially rectangular in shape, as shown, said casing having a flat base 6 and its upper face concaved, as indicated at 7, to conform to the curvature of the tire, whereby the heater may be used for vulcanizing both the inner and outer tubes of a vehicle-tire.

Extending laterally from the opposite longitudinal edges of the casing 5 are lugs 8 and 9, having slots 10 formed therein for the reception of bolts or other suitable fastening devices 11, which extend through said openings and engage a table or other suitable support 12, whereby the vulcanizer may be clamped in position on the inner tube 13 when repairing the latter. The lug 9 terminates in an operating-handle 14, and extended laterally from the casing on each side of the handle 14 are binding-bolts 15 and 16, to which are connected the terminals of an electrical circuit 17.

Secured to the base or support 12 in any suitable manner, as by screws or similar fastening devices 18, is a rheostat, provided with a plurality of resistance-coils 20, operatively connected with a plurality of contacts 21, which coöperate with the movable switch 22, so that by moving the switch successively into engagement with the contacts 21 the temperature of the heater may be regulated at will.

Disposed within the heater is a bar or core 23, preferably formed of metal and covered with a layer of mica or other insulating material 24, said core being embedded in a mixture of cement and asbestos or other suitable insulating and heat-conducting material 25, which entirely fills the compartment formed by the casing.

Connected with the terminals 15 and 16 is a heating-coil 26, the convolutions of which embrace the core 23 and are thus centered with respect to the opposite walls of the casing. The wires 17 are connected in any suitable manner with a plug or socket 27, so that the vulcanizer may be connected in a lighting or other electrical circuit.

As a means for determining the temperature of the heater, there is provided a suitable thermometer 28, the opposite ends of which are clamped between lugs 29, extending laterally from one side of the casing, one of said lugs being detachable, so as to permit the ready removal of the thermometer when desired.

The clamping-screws 11 are provided with suitable wing-nuts 30 and are formed with reduced extensions 31, provided with transverse openings 32, adapted to receive a chain or similar flexible medium 33, when the vulcanizer or casing is used for repairing the outer tube of the tire, as best shown in Figs. 3 and 4 of the drawings.

In operation when it is desired to repair a blow-out or other injury to the inner tube of the tire said tube is removed from the latter and placed in position across the table or support 12, after which the casing or heater is positioned on the injured portion of the tire and clamped in engagement therewith by adjusting the wing-nuts 30. The switch 22 is then rotated so as to admit the current to the coil 26, thus heating the casing to the desired temperature and effecting the union of the severed portion of the tube. When it is desired to repair a puncture in the outer tube, the casing is removed from the support 12 and reversed, being placed in position on the tire with the concaved face bearing against the tire, as best shown in Fig. 3 of the drawings. The terminal hooks 34 of the chain 33 are then introduced in the openings 32 of the clamping-screw 11 and the latter adjusted so as to firmly clamp the casing in position on the tire, as will be readily understood.

In Fig. 5 of the drawings there is illustrated a modified form of the device, in which the heater or casing is preferably formed in two semicircular sections 35 and 36, detachably secured together by bolts or similar fastening devices 37, the cores 38 being curved to conform to the shape of the casing and are provided with heating-coils 39, similar in construction to the coils shown in Fig. 1 of the drawings. When the casing is very large, the core 38 may be formed in sections 40 and the coils 41 connected in multiple with the wires 17, as illustrated in Fig. 6 of the drawings. The vulcanizers may be made in different sizes and shapes and may be nickled, plated, or otherwise coated to give the same a neat attractive appearance.

From the foregoing description it is thought that the construction and operation of the device will be readily understood by those skilled in the art, and further description thereof is deemed unnecessary.

Having thus described the invention, what is claimed is—

1. A vulcanizer including a casing having a flat base and its upper surface concaved, perforated lugs extending laterally from the casing, binding-posts carried by the casing, a heating-coil disposed within the casing and operatively connected with the binding-posts, clamping devices engaging the perforations in the lugs, one of said lugs terminating in an operating-handle.

2. A vulcanizer including a hollow casing having a flat base and its upper surface concaved, perforated lugs extending laterally from the casing, clamping devices engaging the perforations in the lugs, a flexible medium connecting the clamping devices, conducting material disposed within the casing, and a heating-coil embedded in the conducting material and operatively connected with a source of electrical energy.

In testimony that I claim the foregoing as my own I have hereunto affixed my signature in the presence of two witnesses.

CLARENCE A. SHALER.

Witnesses:
 BEN KASTEIN,
 E. A. MARSH.